Patented Sept. 21, 1948

2,449,951

UNITED STATES PATENT OFFICE 2,449,951

STABILIZED HEAT POLYMERIZABLE N-VINYL PYRROLE COMPOSITIONS

William O. Ney, Easton, Pa., assignor to General Aniline & Film Corporation, New York, N. Y., a corporation of Delaware No Drawing. Application February 3, 1945, Serial No. 576,155

6 Claims. (Cl. 260—315)

The present invention relates to polymerizable N-vinyl compounds.

Polymeric N-vinyl compounds of the type disclosed in United States Patent No. 2,072,465 to Reppe et al., which may be obtained by polymerizing N-vinyl compounds, such as N-vinyl pyrrole, or N-vinyl compounds containing the pyrrole ring, such as N-vinyl carbazole, N-vinyl tetracarbazole, N-vinyl propylcarbazole, N-vinyl indole and N-vinyl naphthocarbazole, which, in turn, may be produced in the manner disclosed in United States Patent No. 2,066,160, to Reppe et al., have many unique and valuable properties which render them quite useful in numerous arts. These polymers are particularly useful in the electrical field as low loss insulation material since the polymeric N-vinyl compounds have excellent electrical properties, such as very high resistance and low power factor, and they retain these good electrical properties up to high temperatures. In addition, these polymeric N-vinyl compounds possess unusually high melting or softening points so that they may be used at higher temperatures than is possible with most other polymeric or resinous compounds. However, this high melting or softening point which is particularly valuable in polymeric N-vinyl compounds, at times, renders their use quite difficult and actually prevents their use in certain applications, since this high melting point makes it very difficult to apply the polymer where it is necessary to employ a fluid material.

An illustration of an instance, in which the application of a polymeric N-vinyl compound is quite difficult, is the impregnation of porous material, for instance, paper. In impregnating such porous materials, it is desirable to use a relatively fluid impregnant in order to assure a thorough impregnation. However, in the case of polymeric N-vinyl compounds, such as polyvinyl carbazole, it is impossible to sufficiently soften the polymer by heat in order to satisfactorily impregnate many materials. This difficulty can only partially be overcome by the use of solvents to obtain a solution of the polymeric N-vinyl compound and employing such solution for impregnation. In many instances, the removal of the solvent presents a serious problem and, in addition, the type of deposit remaining after removal of the solvent is frequently unsatisfactory. Thus, the deposit is frequently insufficiently dense to be acceptable. In other instances, the softening point of the polymeric N-vinyl compound may be lowered by the use of various plasticizers. However, this is not always desirable since frequently the high softening point is a desired property of the polymer.

In accordance with the present invention, the above-mentioned difficulties are overcome, in the case of the impregnation of porous materials and in many other applications of polymeric N-vinyl compounds, by impregnating the material with the monomeric N-vinyl compound at a temperature slightly above the melting point of the monomer. These monomers have relatively low melting points, vinyl carbazole, for instance, melts at 65° C., and flow freely. The monomer impregnated material may then be heated in order to polymerize the monomeric N-vinyl compound in situ. Considerable difficulties are encountered, however, in this type of operation since rapid polymerization of the monomeric N-vinyl compounds takes place at temperatures only slightly above their melting point. In fact, a certain amount of polymerization occurs on standing at room temperature. The result is that, in many instances, when it is attempted to employ the molten monomer, polymerization is so rapid that satisfactory results are difficult, if not impossible, to obtain.

The difficulties caused by the rapid polymerization of the molten monomer can be overcome by the use of known polymerization inhibitors for the N-vinyl compounds. Such known inhibitors are alkalies of various types and hydroxy organic compounds, particularly aliphatic hydroxy compounds. But while such known inhibitors prevent too rapid a polymerization, their use is objectionable since when they are employed in an effective amount, they not only inhibit the polymerization at temperatures slightly above the melting point of the monomer but also exert a strong polymerization inhibiting action at substantially higher temperatures, and frequently have an adverse effect on the properties of the polymer which is obtained.

It is, therefore, an object of the present invention to provide a polymerizable N-vinyl compound containing an inhibitor which will effectively inhibit the polymerization of the monomer at a temperature slightly above the melting point of the monomer but which, at a slightly higher temperature, has relatively little inhibiting effect and permits the polymerization to proceed rapidly.

Other and further objects will be apparent as the present description progresses.

The inhibitors, which I have found are valuable for our purpose, exert a strong inhibiting action at a temperature near the melting point of the monomeric N-vinyl compounds, but they have practically no inhibiting effect at slightly higher and readily obtainable temperatures, preferably within the range of 100–150° C. In addition, the inhibitors which I employ are without noticeable adverse effect on the desired physical and electrical properties of the polymeric N-vinyl compounds.

The inhibitors which I have discovered possess these desirable properties are acetamide, dimethyl formamide, and acetoacetanilide. These inhibitors may be used in amounts varying from traces to perhaps 5%, preferably from 0.25% to 1% by weight of inhibitor is employed. When smaller amounts are employed than this preferred range, the inhibiting effect is frequently not sufficiently great at temperatures slightly above the melting point of the monomer, and while larger amounts may be employed, they are unnecessary, and substantially no improvement is noticeable in inhibiting effect at temperatures near the melting point of the monomer while a slightly greater inhibiting effect is noticeable at higher temperatures.

In practicing the present invention, the inhibitor is mixed with the monomer in the amount specified above. This mixing may be effected conveniently by mere mechanical mixing of the inhibitor and monomer, or the inhibitor may be added to a solution of the monomer in a preferably low boiling solvent, for instance toluene, and evaporating off the solvent. Various other methods of incorporating the inhibitor in the monomer will suggest themselves to those skilled in the art and may be employed if desired. The mixture of monomer containing the inhibitor is then melted by heating to a temperature only slightly above the melting point of the monomer, and this molten mixture may then be employed in any desired manner. Thus, the molten monomer containing the inhibitor may be applied as a liquid coating to a porous material or porous articles may be dipped in the molten bath or the molten material may be flowed into a mold. It should be understood that the molten material should be used at temperatures only slightly above the melting point of the monomer so that the inhibitor exerts its maximum effectiveness during this use. Once the monomer has been satisfactorily applied to whatever material it is being used on, the material is then heated to a temperature within the range of 100–150° C. At this temperature, the inhibitor no longer is effective, and the monomeric N-vinyl compound rapidly polymerizes. This elevated temperature is maintained until the desired degree of polymerization has been obtained. In general, polymerization is substantially complete within 30 minutes at a temperature of 120° C. At low temperatures, a slightly longer time is required for complete polymerization, while a slightly shorter time is required at higher temperatures.

The following specific examples illustrate the practice of the present invention:

Example 1

When admixed with 0.1% of dimethyl formamide, N-vinyl carbazole does not polymerize when held at 70° C. in the fused state for 16 hours. When the temperature is raised to 140° C., however, the polymerization is complete in 10 minutes. While the use of nitrogeneous organic substances as inhibitors for the polymerization has already been disclosed, we want to emphasize the fact that all such substances are not equivalent in this action. Thus, an equal amount of aniline prevented the polymerization at 70° C. for five days, but 18 hours are required for complete polymerization at 120° C.

Example 2

When admixed with 0.1% by weight of acetoacetanilide, N-vinyl carbazole requires about 14 hours to polymerize in the fused state at 70° C. If the temperature is raised to 125° C., however, polymerization is complete within 30 minutes.

Example 3

The addition of 0.5% by weight of acetamide to N-vinyl carbazole gave a mixture which did not polymerize completely in 50 hours at 70° C. but which set up to a glass-hard polymer at 120° C. in 30 minutes.

The stabilized monomeric compositions containing dimethyl formamide, acetamide or acetoacetanilide, described in the preceding examples, can be readily employed for impregnating porous materials at temperatures slightly above the melting point of the stabilized compound, and after impregnation, the monomer may be polymerized by heating to higher temperatures within the range of 100–150° C. for a sufficient length of time to effect the desired degree of polymerization. These compositions are also suitable for use in casting operations in which the molten monomer, withdrawn from a bath of stabilized monomer held at a temperature slightly above its melting point, is cast in a suitable mold and then polymerized by heating to a higher temperature within the range of 100–150° C., at which polymerization will proceed rapidly in the presence of the stabilizers. It should be understood that the term "casting" as employed in the present specification and claims includes such operations as impregnation and molding in which the stabilized monomer is employed in molten state and polymerized, in situ, after its application, by heating to a sufficient temperature to overcome the effect of the stabilizer.

While several specific preferred embodiments of the present invention have been described in detail, it will be understood that the present invention is not limited to these specific examples and that various modifications may be made therein, as heretofore indicated, without departing from the spirit of this invention or the scope of the appended claims.

I claim:

1. As a heat polymerizable N-vinyl pyrrole composition which is stabilized to polymerization in the molten state at temperatures slightly above its melting point but which may be readily polymerized by heating at temperatures above 100° C., a heat polymerizable monomeric N-vinyl pyrrole compound having a melting point below 100° C. containing an effective amount, up to 5 percent, of a compound selected from the group consisting of formamide, acetamide and acetoacetanilide to stabilize said N-vinyl pyrrole compound at temperatures slightly above its melting point.

2. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount, up to 5 percent, of a compound selected from the group consisting of formamide, acetamide and acetoacetanilide to stabilize said N-vinyl carbazole at temperatures slightly above its melting point.

3. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount, up to 5 percent, of formamide to stabilize said N-vinyl carbazole at temperatures slightly above its melting point.

4. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount, up to 5 percent, of acetamide to stabilize said N-vinyl carbazole at temperatures slightly above its melting point.

5. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount, up to a few percent, of acetoacetanilide to stabilize said N-vinyl carbazole at temperatures slightly above its melting point.

6. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount up to 1% of a compound selected from the group consisting of formamide, acetamide and acetoacetanilide to stabilize said N-vinyl carbazole at temperatures slightly above its melting point.

WILLIAM O. NEY.

REFERENCES CITED

The following references are of record in the file of this patent:

UNITED STATES PATENTS

| Number | Name | Date |
|---|---|---|
| 2,072,465 | Reppe et al. | Mar. 2, 1937 |
| 2,129,478 | Rohm | Sept. 6, 1938 |

---

Certificate of Correction

Patent No. 2,449,951.  September 21, 1948.

WILLIAM O. NEY

It is hereby certified that error appears in the printed specification of the above numbered patent requiring correction as follows:

Column 6, line 2, claim 5, for the words "a few" read the numeral 5;

and that the said Letters Patent should be read with this correction therein that the same may conform to the record of the case in the Patent Office.

Signed and sealed this 21st day of December, A. D. 1948.

[SEAL]

THOMAS F. MURPHY,
*Assistant Commissioner of Patents.*

N-vinyl carbazole at temperatures slightly above its melting point.

3. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount, up to 5 percent, of formamide to stabilize said N-vinyl carbazole at temperatures slightly above its melting point.

4. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount, up to 5 percent, of acetamide to stabilize said N-vinyl carbazole at temperatures slightly above its melting point.

5. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount, up to a few percent, of acetoacetanilide to stabilize said N-vinyl carbazole at temperatures slightly above its melting point.

6. As a heat polymerizable N-vinyl carbazole composition which is stabilized to polymerization in the molten state at temperatures slightly above its melting point but which may be readily polymerized by heating at temperatures above 100° C., monomeric N-vinyl carbazole containing an effective amount up to 1% of a compound selected from the group consisting of formamide, acetamide and acetoacetanilide to stabilize said N-vinyl carbazole at temperatures slightly above its melting point.

WILLIAM O. NEY.

REFERENCES CITED

The following references are of record in the file of this patent:

UNITED STATES PATENTS

| Number | Name | Date |
|---|---|---|
| 2,072,465 | Reppe et al. | Mar. 2, 1937 |
| 2,129,478 | Rohm | Sept. 6, 1938 |

---

Certificate of Correction

Patent No. 2,449,951.  September 21, 1948.

WILLIAM O. NEY

It is hereby certified that error appears in the printed specification of the above numbered patent requiring correction as follows:

Column 6, line 2, claim 5, for the words "a few" read the numeral 5;

and that the said Letters Patent should be read with this correction therein that the same may conform to the record of the case in the Patent Office.

Signed and sealed this 21st day of December, A. D. 1948.

[SEAL]

THOMAS F. MURPHY,
*Assistant Commissioner of Patents.*